DRY ADHESION METHOD FOR ADHERING
TEXTILE MATERIAL TO RUBBER
Filed Oct. 29, 1953
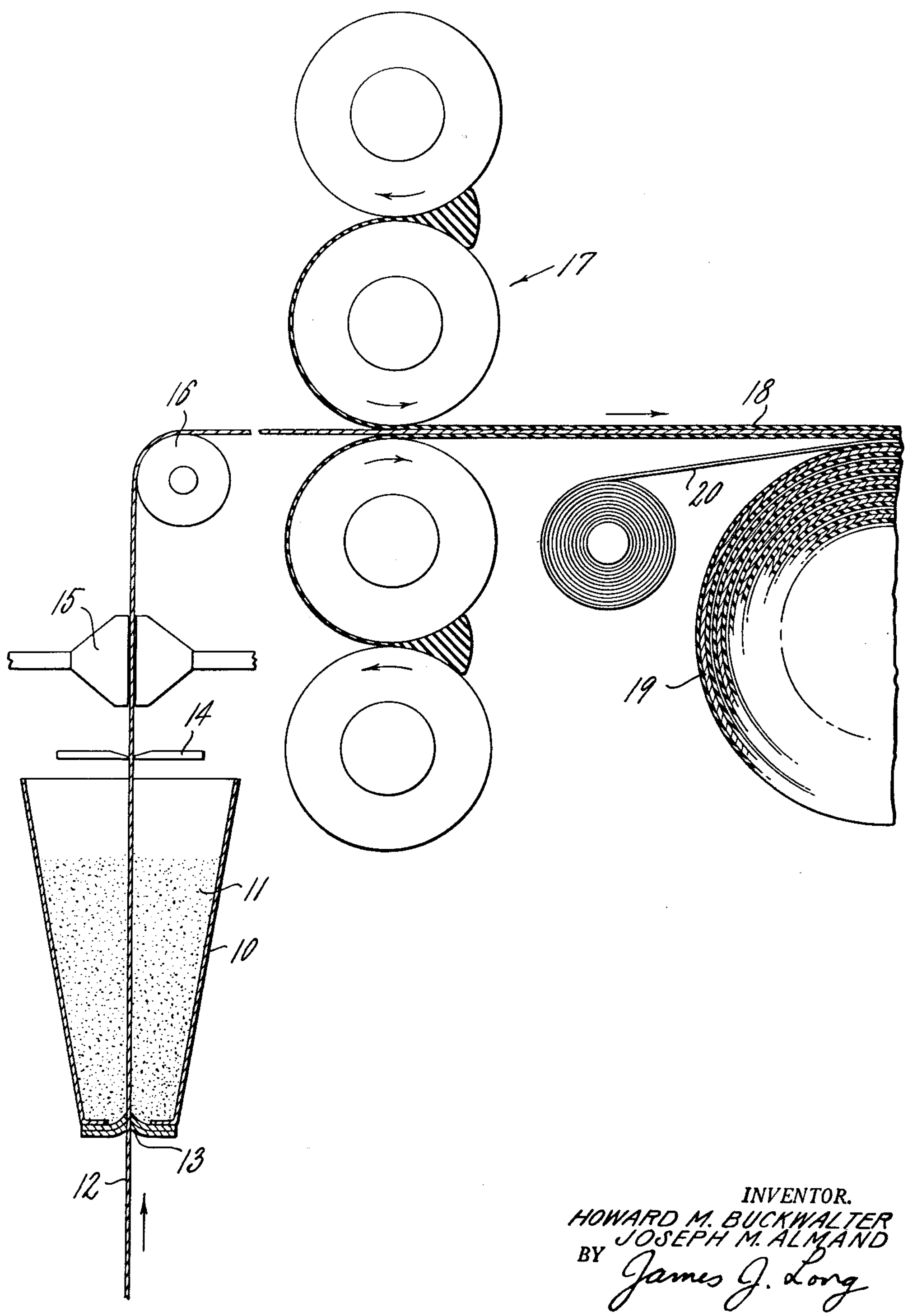
INVENTOR.
HOWARD M. BUCKWALTER
JOSEPH M. ALMAND
BY James J. Long
AGENT United States Patent Office 2,746,898
Patented May 22, 1956

1

2,746,898

DRY ADHESION METHOD FOR ADHERING TEXTILE MATERIAL TO RUBBER

Howard M. Buckwalter and Joseph M. Almand, Detroit, Mich., assignors to United States Rubber Company, New York, N. Y., a corporation of New Jersey Application October 29, 1953, Serial No. 389,118

7 Claims. (Cl. 154—139)

This invention is concerned with an improved method of adhering textiles to rubber and more particularly the invention involves applying certain adhesive-forming chemicals in an unreacted state to the materials to be joined, and subsequently joining the materials and bringing about reaction of the adhesive-forming chemicals.

In certain rubber articles designed to withstand considerable stresses in use, the rubber is reinforced with comparatively inextensible textile materials. Thus, rubber hose, belts and tires are commonly reinforced with filamentary textiles in the form of yarns, cords or fabric. In such articles, it is important that the textile reinforcing material be firmly adhered to the rubber and remain effectively adhered even after the article has been subjected to repeated varying strains in use, because any separation and relative movement of the rubber and textile parts leads to abrasion between these parts and consequent early failure.

The prior art methods and materials for adhering textiles to rubber have had a number of shortcomings, and there has therefore been a continuing desire for more efficient and satisfactory methods of providing the required adhesion, as evidenced by the large number of adhesive preparations in commercial use as well as the growing volume of technical and patent literature on this subject.

The problem of providing adequate adhesion in an efficient manner has been particularly acute in the case of pneumatic tires. The best previously known method of adhering tire cord to the rubber carcass stock has been to apply to the cord a solution comprising rubber latex (butadiene-vinylpyridine copolymer latex being especially suited for this purpose) together with a partially condensed resorcinol-formaldehyde resin and additional formaldehyde in amount sufficient to complete the condensation of the resin. The tire cord was passed through such a solution in the form of a web fabric or cord fabric, leaving a deposit not only on the exterior surface of the cord but also substantially penetrating into the interstices of the cord. After passing from the solutioning apparatus the cord was introduced into a long drying and curing oven wherein the water was evaporated from the deposited solution and at the same time the partially condensed resorcinol-formaldehyde resin reacted with the formaldehyde liberated by a formaldehyde-yielding agent, thereby advancing the resin to a more highly condensed state. Upon completion of such drying and curing operation, the cords, which were now stiff because of the resin deposit, were passed through the usual calender, where a thin skim coat of vulcanizable rubber carcass stock was applied to the cord. The resulting rubberized tire fabric was used to build up the raw tire casing in the usual way, and the entire assembly was subsequently cured in the usual tire mold.

The conventional tire cord solutioning process not only requires extensive equipment that is expensive to install and maintain, but there are also inherent disadvantages in the process consequent to the physical and chemical nature of the adhesive solution. The latex bath is comparatively unstable and tends to deposit an undesirable coagulum over a period of time. The resorcinol-formaldehyde resin must be prepared and used with great care to provide consistent adhesion. Even when exercising careful controls, variable results are frequently noticed. The efficacy of the adhesive solution changes unpredictably with age. The drying and curing steps are of necessity time-consuming. Undesirable stiffness is imparted to the cord fabric due to penetration of the latex-resin solution into the interior of the cords, where solid material is thus deposited to the detriment of the flexibility and fatigue life of the cords. The performance of the finally resulting rubber-textile laminate in the finished tire leaves much to be desired, not only from the standpoint of adhesion, but with respect to other characteristics as well, particularly fabric fatigue.

2

Accordingly, a principal object of the present invention is to provide a new and improved process for adhering textile materials to rubber, that mitigates the disadvantages of previously known methods.

Another cardinal object is the provision of a method of adhering textiles to rubber that makes possible remarkably improved fatigue life in the textile.

Another object of the invention is to provide a method that makes it possible to adhere textiles to rubber with greater tenacity than has heretofore been readily attainable.

Still another object is to provide a method of adhering textile materials to rubber that can be carried out more conveniently and more economically than previously employed processes.

The manner in which the invention realizes the foregoing and other objects and advantages will be made clear in the following detailed description, which is intended to be read with reference to the accompanying drawing, wherein the single figure depicts in a purely diagrammatic fashion one method of carrying out the invention.

The invention is based upon the discovery that if resorcinol and paraformaldehyde, both in the dry state, are applied as such to either or both the textile material and the rubber, before bringing the textile and rubber together, and if the textile and rubber are then brought together and heated to a temperature sufficient to bring about reaction between the resorcinol and the paraformaldehyde substance, there results an unprecedentedly firm bond between the rubber and the textile. Not the least remarkable feature of the improved process is that the essential adhesion forming chemicals are applied dry, thereby avoiding the penetration of the adhesive into the textile structure that invariably and unavoidably occurs in the usual wet latex-resin solutioning process. The rubber-fabric laminates made by the method of the invention are therefore characterized by greatly improved resistance to fabric fatigue.

The invention may be carried out by placing both the resorcinol and the paraformaldehyde on the surface of the textile material, or on the surface of the rubber stock, or either one of the chemicals may be placed on the textile surface while the remaining chemical is placed on the rubber surface. It is also possible to obtain good adhesion by mixing the resorcinol and the paraformaldehyde with the rubber stock, as by a milling operation, but if this is done care must be taken not to subject the stock to a temperature sufficiently elevated to cause reaction between the resorcinol and the paraformaldehyde, otherwise the adhesion of the rubber to a subsequently applied textile will be poor and the benefits of the invention will be lost. The milling temperatures obtained during ordinary factory compounding of carcass stock are more than sufficient to produce premature undesirable reaction of the resorcinol with the paraformaldehyde, and therefore if the two chemicals are mixed into the rubber stock unusually low mixing temperatures must be used, as will be explained in more detail below.

A preferred practice is to mix only one of the adhesive-forming chemicals, such as the resorcinol, with the rubber stock, and apply the remaining chemical, such as the paraformaldehyde, to the textile. Thus, paraformaldehyde may be dusted onto the surface of the textile by any convenient method, or, paraformaldehyde may be introduced into the textile as a gas or vapor by exposing the textile in a chamber containing paraformaldehyde heated to sublimation temperature. The practice of adding only one of the adhesive-forming ingredients to the rubber stock is particularly advantageous because it permits the rubber stock to be mixed at ordinary factory mixing temperatures, which are higher than the temperature at which the two resin-forming chemicals would react if they were present together in the stock.

Regardless of the method of applying the adhesive-forming chemicals to the rubber or to the textile or both, it has been found essential for purposes of the invention to bring the textile and the rubber together before the resorcinol and paraformaldehyde react with each other to form a resin. Application of the preformed resin, even in only a partially condensed state, will not produce the desired improvement.

The resorcinol and formaldehyde-yielding substance are usually employed in such relative amounts as to provide about two moles of formaldehyde for each mole of resorcinol, although good results are also obtainable even when the ratio departs widely from this value, even down to as little as one-half a mole of paraformaldehyde, up to as much as four moles of paraformaldehyde, per mole of resorcinol. However, it will be understood that wide departures from the two-to-one mole ratio occasion economic waste since they represent a large excess of either unutilized formaldehyde or unutilized resorcinol. In the preferred practice of the invention there is separately deposited in the rubber and in the textile from one-tenth of one per cent to eight per cent by weight of each of the resorcinol and the paraformaldehyde.

The textile material employed in the present process may be any of the usual textiles used for reinforcing rubber, such as cotton or rayon, or purely synthetic textiles such as nylon. The improvement in fatigue characteristics made possible by the present invention is particularly striking in the case of nylon. Ordinarily, nylon is rendered unusually stiff by the conventional latex solutioning process.

The rubber stocks employed in the invention may be conventional vulcanizable rubber compounds, including not only natural (Hevea) rubber stocks but also the synthetic rubber made by copolymerizing butadiene with styrene (GR–S or Buna–S) in emulsion in the well known manner. In practice, the rubber stock frequently includes more or less of various kinds of reclaim rubber. For pneumatic tire carcasses natural rubber is still the preferred rubber.

The following examples will serve to illustrate the practice of the invention in more detail.

*Example 1*

The equipment used in this example is illustrated in the drawing, and included a hopper 10 containing commercial paraformaldehyde 11 in the form of a powder of 200 mesh size. Rayon tire cords 12 to be treated in accordance with the invention were passed upwardly in parallel side-by-side relation in the form of a cord fabric of the desired width through a closely fitting slit formed in the flexible bottom 13 of the hopper, and in this manner a quantity of the powdered paraformaldehyde was deposited on the surface of the tire cords. The excess paraformaldehyde was scraped off of the surface of the cords with the aid of doctor blades 14 supported above the hopper in such manner as to bear against the surface of the upwardly moving cords. The cords were then passed between vacuum cleaners 15 that served to remove any additional loose paraformaldehyde from between the cords. By this process, the cord had deposited thereon 2.0% by weight of paraformaldehyde. After passing over a roller 16, the paraformaldehyde-containing cords were introduced to a four-roll rubber calender 17 wherein a thin skim coating 18 of rubber stock was applied to each surface of the cords to form a tire fabric. The rubber stock was a conventional natural rubber tire carcass stock compounded for sulfur vulcanization in the usual manner, and containing, in addition to the conventional ingredients, 0.64% of commercial resorcinol which was added to the skim coat stock during the milling thereof in the form of flakes, M. P. 108–110° C.

The thus-prepared tire fabric was wound up into a roll 19 with the usual fabric liner 20, and the fabric was thereafter employed to construct a tire casing in the usual manner. It was observed that the raw tire fabric made in this manner was remarkably flexible, compared to conventional tire fabrics, because of the fact that it had not been treated with the usual latex adhesive solution, and therefore the cord was not impregnated with the solid substances ordinarily deposited on and within the cord in the usual solution in process. For this reason, the tire fabric draped very easily and had unusually good building characteristics, since it could be assembled and shaped on the tire building drum with great facility.

The assembled tire casing was thereafter vulcanized in a tire mold by heat in accordance with conventional practice. During the course of the vulcanization the resorcinol in the skim coat rubber reacted with the paraformaldehyde on the cord to form the desired adhesive resorcinol-formaldehyde resin in situ at the interface of the cord and the rubber skim coat.

The adhesion of the cord to the carcass stock was measured by the "H" adhesion test, described in United States Department of Agriculture publication AIC–99, by Lyons, Nelson and Conrad, the rubber being cured for 45 minutes at 45 pounds. In this test the adhesion of the cord to the rubber was observed to be 22.5 pounds. A control sample that received no adhesive treatment had an adhesion of only 6.8 pounds when similarly tested, and an additional control sample that received the conventional latex adhesive solutioning treatment (butadiene-styrene copolymer latex and resorcinol-formaldehyde resin), in which 9–11% of the adhesive materials were deposited on the cord, displayed an adhesion of only 16.9 pounds. The flexing life of the rubber-fabric laminates was tested on a device known as the dome flexometer, which is described in copending application Serial No. 223,417 of Ernest B. Dodge, filed April 27, 1951, now U. S. Patent No. 2,669,119. The flex life was 83 minutes for the laminate of the invention, compared with a flex life of only 65 minutes for the conventional one. Fatigue life was 106 minutes for the laminate of the invention, compared to only 57 minutes for the conventional one.

The pneumatic tire made with the tire fabric resulting from the process of the invention was not only superior to conventional tires by reason of the improved adhesion of the cords to the carcass stock, but the tire was also superior from the standpoint of hysteresis and heat build-up within the tire because the casing was more flexible, due to the absence of adhesive solids within the cord structure, such as result from the usual solutioning process in which the latex-resin solution penetrates into the cords and deposits solids therein.

*Example 2*

A natural rubber carcass stock was prepared by milling 0.97% of resorcinol into the rubber hydrocarbon at 150° F., following which the usual sulfur, accelerator, antioxidant, etc., were mixed in at the same temperature, and thereafter 1.6% of paraformaldehyde was incorporated at a temperature of 110–115° F. Tests showed that no appreciable condensation (chemical reaction) of the adhesive-forming chemicals occurred during this mixing, nor did it occur in the uncured stock after at least one month of shelf aging.

The foregoing carcass stock was calendered onto rayon tire cord fabric that had received no previous adhesive treatment. The adhesion of the tire cord to the carcass stock after curing for 45 minutes at 45 pounds was 22.7 pounds by the "H" test, as compared to 6.8 pounds for a control having no adhesive treatment, and as compared to 16.9 pounds for a control having the conventional latex adhesive treatment.

There was no detectable diminution in the ability of the rubber stock to form a cured adhesive bond with grey rayon cord over a period of at least four weeks.

*Example 3*

A mixture of resorcinol and formaldehyde, in mole ratio of 1:2, was prepared in the form of a dry powder of 200 mesh size. This powder was dusted on rayon tire cord fabric in such manner that the cord contained 2% by weight of the powder on its surface. The thus-treated cord fabric was then vulcanized in contact with a conventional natural rubber carcass stock, with the result that the adhesive resorcinol-formaldehyde resin was formed in situ at the interface of the cord and the rubber stock during the vulcanization. In this manner, an adhesion of 18.6 pounds was obtained.

*Example 4*

The foregoing example was repeated, except that the dry powdered mixture of resorcinol and paraformaldehyde was applied to the surface of the skim coat stock in amount of 3.0%. After the stock was cured in contact with rayon tire cord, the adhesion was observed to be 19.8 pounds. The flexing life of the rubber-fabric laminate made in this way was tested on the dome flexometer and was observed to be 95 minutes—a value that compares favorably with a mean life of 65 minutes when the tire cord is subjected to the usual wet adhesive treatment with a latex-resin solution.

*Example 5*

Grey rayon tire cord was exposed to the sublimed vapor of paraformaldehyde for a period of 21 hours at 100° C., yielding a cord having a paraformaldehyde content of 1%. A conventional skim coat rubber stock was milled with powdered resorcinol, so as to provide a concentration of about 0.64% of this chemical in the skim coat stock. The cord and the skim coat were then united and vulcanized, whereupon the adhesion was determined to be 22.2 pounds.

*Example 6*

Example 1 was repeated, except that the paraformaldehyde was applied to only side of the rayon cord fabric by means of an applicator roll, which deposited 2% of the paraformaldehyde on one side of the fabric, following which a carcass stock containing 1% of resorcinol was calendered onto each side of the fabric, and the assembly was vulcanized. The solid polymeric formaldehyde thermally decomposed into its gaseous monomeric form during the vulcanization, and diffused through the assembly, thus assuring the presence of the formaldehyde over the total rubber-fabric interface. Good adhesion was obtained, as well as satisfactory resistance to ply separation and fabric fatigue, as measured by the dome flexometer test, in comparison to similar laminates made with cord that had received the usual conventional latex solutioning treatment.

*Example 7*

Example 1 was repeated, using nylon tire cords. The H-adhesion was 19.4 pounds, compared to only 14.6 pounds for a control treated with the conventional latex solution.

From the foregoing examples it will be apparent to those skilled in the art of tire manufacture that the invention affords an unusually effective and convenient way of forming the required adhesive bond between the tire fabric and the rubber carcass stock. The method described is characterized by the fact that the adhesive resin is not formed until after the rubber and fabric are united, and in this respect the present method differs markedly from the previously known methods of adhering rubber to fabric, wherein the resorcinol and formaldehyde were always condensed at least partially before the rubber and fabric were united.

Aside from the fact that the invention makes possible an unusually high grade of adhesion, several other important practical advantages flow from the fact that the invention characteristically applies the resin-forming materials, which do not contain rubber, in a dry, solid condition, in contrast to the previously used tire cord solutioning processes. The dry application of the adhesive-forming chemicals not only makes it possible to dispense with the usual solutioning and drying operations and equipment, but also makes it possible to achieve quality improvements both in the tire fabric itself, which is more flexible and more susceptible to tire building operations because of the absence of excess deposited chemicals in the interior of the cord, such as necessarily results when the cord is treated with a penetrating solution, as well as quality improvements in the finished tire by reason of the increased flexibility, improved fatigue resistance, and diminished heat build-up of the tire casing made with such fabric.

Having thus described our invention, what we claim and desire to protect by Letters Patent is:

1. A method of adhering tire cord to a rubber carcass stock in which the rubber is selected from the group consisting of Hevea rubber and butadiene-styrene copolymer rubber comprising separately applying dry unreacted resorcinol as such and dry unreacted paraformaldehyde as such to the tire cord and carcass stock, respectively, thereafter uniting the tire cord and carcass stock, and thereafter heating the assembly to vulcanize the rubber and form a resorcinol-formaldehyde resin in situ at the interface of the tire cord and carcass stock.

2. A method of adhering textile material to a rubber selected from the group consisting of Hevea rubber and butadiene-styrene copolymer rubber comprising applying to the surface only of the textile dry paraformaldehyde as such, mixing in with the rubber dry solid resorcinol as such, thereafter uniting the textile and the rubber, and heating the assembly to form a resorcinol-formaldehyde resin at the interface of the textile and rubber.

3. A method of adhering textile material to a rubber selected from the group consisting of Hevea rubber and butadiene-styrene copolymer rubber comprising milling into the dry solid rubber dry solid resorcinol as such and dry solid paraformaldehyde as such at a temperature below the temperature at which resorcinol and formaldehyde react to form a resin, thereafter bringing the textile and rubber together, and thereafter heating the assembly to a temperature sufficient to form a resorcinol-formaldehyde resin.

4. A method of adhering textile material to a rubber selected from the group consisting of Hevea rubber and butadiene-styrene copolymer rubber comprising making a physical mixture of dry solid resorcinol as such and dry solid paraformaldehyde as such, dusting the solid physical mixture on the textile, uniting the textile to the rubber stock, and heating to vulcanize the rubber and form resorcinol-formaldehyde resin in situ only at the interface between the fabric and the rubber.

5. A method of adhering textile material to a rubber selected from the group consisting of Hevea rubber and butadiene-styrene copolymer rubber comprising making a physical mixture of dry solid resorcinol as such and dry solid paraformaldehyde as such, dusting the solid physical mixture on the surface of the rubber, applying the textile to such surface, and heating to vulcanize the rubber and form resorcinol-formaldehyde resin in situ only at said surface.

6. A method of adhering textile material to a rubber selected from the group consisting of Hevea rubber and butadiene-styrene copolymer rubber comprising subjecting the textile to an atmosphere of subliming paraformaldehyde, milling dry solid resorcinol as such into the rubber stock, thereafter bringing the textile and rubber together, and thereafter heating the assembly to vulcanize the rubber and form resorcinol-formaldehyde resin at the interface of rubber and textile.

7. A method of adhering nylon to a rubber selected from the group consisting of Hevea rubber and butadiene-styrene copolymer rubber comprising applying to the nylon dry paraformaldehyde as such, milling into the rubber dry solid resorcinol as such, bringing the nylon and rubber together, and thereafter heating the assembly to vulcanize the rubber and form resorcinol-formaldehyde resin in situ at the interface of the nylon and the rubber.

References Cited in the file of this patent

UNITED STATES PATENTS

| | | |
|---|---|---|
| 1,978,807 | Merritt | Oct. 30, 1934 |
| 2,128,229 | Charch et al. | Aug. 30, 1938 |
| 2,188,434 | Grinter | Jan. 30, 1940 |
| 2,639,258 | Evans et al. | May 19, 1953 |
| 2,697,058 | Lasak | Dec. 14, 1954 |